United States Patent
Kutlik et al.

(10) Patent No.: US 9,052,230 B2
(45) Date of Patent: Jun. 9, 2015

(54) INDUSTRIAL PROCESS MONITORING AND IMAGING

(75) Inventors: Roy Lester Kutlik, Oakland, CA (US);
Mahmoud Farhadiroushan, London (GB); Tom Richard Parker, Elstree (GB); Huping Luo, El Cerrito, CA (US);
Daniel Finfer, London (GB)

(73) Assignees: CHEVRON U.S.A. INC, San Ramon, CA (US); SILIXA LIMITED, Elstree (GB)

( * ) Notice: Subject to any disclaimer, the term of this patent is extended or adjusted under 35 U.S.C. 154(b) by 892 days.

(21) Appl. No.: 13/107,544

(22) Filed: May 13, 2011

(65) Prior Publication Data

US 2012/0287749 A1 Nov. 15, 2012

(51) Int. Cl.
*G03B 42/06* (2006.01)
*G01H 9/00* (2006.01)
*G01H 3/12* (2006.01)
*G01F 23/296* (2006.01)
*G01S 5/18* (2006.01)

(52) U.S. Cl.
CPC ............... *G01H 9/00* (2013.01); *G03B 42/06* (2013.01); *G01H 3/125* (2013.01); *G01H 9/004* (2013.01); *G01F 23/2961* (2013.01); *G01F 23/2962* (2013.01); *G01S 5/18* (2013.01)

(58) Field of Classification Search
CPC ..................................................... G02B 42/06
USPC ............ 73/290 V, 587, 579, 602, 628; 201/1; 367/7
See application file for complete search history.

(56) References Cited

U.S. PATENT DOCUMENTS

| | | | |
|---|---|---|---|
| 4,352,167 | A | 9/1982 | Hashimoto |
| 4,410,398 | A | 10/1983 | Chipman et al. |
| 4,641,526 | A | 2/1987 | Izumi et al. |
| 4,993,264 | A | 2/1991 | Cody |
| 5,022,268 | A * | 6/1991 | Wolf et al. ............... 73/602 |
| 5,031,451 | A | 7/1991 | Webster |
| 5,140,559 | A | 8/1992 | Fisher |
| 5,333,129 | A | 7/1994 | Buckingham |

(Continued)

FOREIGN PATENT DOCUMENTS

| | | |
|---|---|---|
| DE | 19830442 | 1/2000 |
| EP | 0128507 A2 | 12/1984 |

(Continued)

OTHER PUBLICATIONS

Communication Relating to the Result of a Partial International Search Report. Annex to Form PCT/ISA/206. International Application No. PCT/US2012/036527 (Mar. 28, 2013).

(Continued)

*Primary Examiner* — Mark Hellner
(74) *Attorney, Agent, or Firm* — Dickinson Wright PLLC

(57) ABSTRACT

Exemplary embodiments include an apparatus for imaging a volume of material contained inside a vessel. The apparatus includes a plurality of synchronized acoustic sensors positioned at a periphery of an inner volume of the vessel. A processor combines the outputs of the acoustic sensors to identify at least one ambient noise source of the industrial process generating a noise field that illuminates an internal volume of the vessel and to provide an image of the material by temporal and spatial coherent processing of the transmission and reflection of the noise field generated by the noise source.

15 Claims, 16 Drawing Sheets

(56) References Cited

U.S. PATENT DOCUMENTS

| | | |
|---|---|---|
| 5,517,537 A | 5/1996 | Greene et al. |
| 5,533,383 A | 7/1996 | Greene et al. |
| 5,750,895 A | 5/1998 | Chern |
| 5,974,887 A * | 11/1999 | Cody et al. ............ 73/602 |
| 6,216,540 B1 | 4/2001 | Nelson et al. |
| 6,278,890 B1 | 8/2001 | Chassaing et al. |
| 6,460,412 B1 * | 10/2002 | Cai et al. ............ 73/290 V |
| 6,770,032 B2 * | 8/2004 | Kaplan ............ 600/437 |
| 6,874,361 B1 | 4/2005 | Meltz et al. |
| 7,355,163 B2 | 4/2008 | Watley et al. |
| 7,397,976 B2 | 7/2008 | Mendez et al. |
| 7,935,226 B2 * | 5/2011 | Song et al. ............ 201/1 |
| 2007/0003450 A1 | 1/2007 | Burdett |
| 2007/0038393 A1 | 2/2007 | Borah et al. |
| 2007/0258331 A1 | 11/2007 | Bevan et al. |
| 2009/0007627 A1 * | 1/2009 | Perl et al. ............ 73/1.73 |
| 2009/0059721 A1 | 3/2009 | Simon |
| 2009/0282910 A1 | 11/2009 | Song |
| 2010/0135119 A1 | 6/2010 | Paget |
| 2011/0109627 A1 | 5/2011 | Zhang |
| 2011/0154900 A1 | 6/2011 | Watanabe et al. |
| 2012/0060615 A1 * | 3/2012 | Farhadiroushan et al. ..... 73/655 |
| 2012/0162639 A1 | 6/2012 | Farhadiroushan et al. |

FOREIGN PATENT DOCUMENTS

| | | |
|---|---|---|
| EP | 0382977 A2 | 8/1990 |
| EP | 0697595 A1 | 7/1995 |
| EP | 0707205 A2 | 4/1996 |
| EP | 2192 593 A1 | 6/2010 |
| GB | 211511 A | 2/1924 |
| GB | 2115171 B | 9/1983 |
| WO | WO 2006/010959 | 2/2006 |
| WO | 2009004381 | 1/2009 |
| WO | 2009063194 | 5/2009 |
| WO | WO 2009/056855 | 5/2009 |
| WO | WO 2010/136809 A2 | 12/2010 |

OTHER PUBLICATIONS

International Preliminary Examination Report for corresponding application PCT/US2012/036527 dated 13 May 2011.

International Search report for corresponding application PCT/US2012/036527 dated 22 Nov. 2012.

* cited by examiner

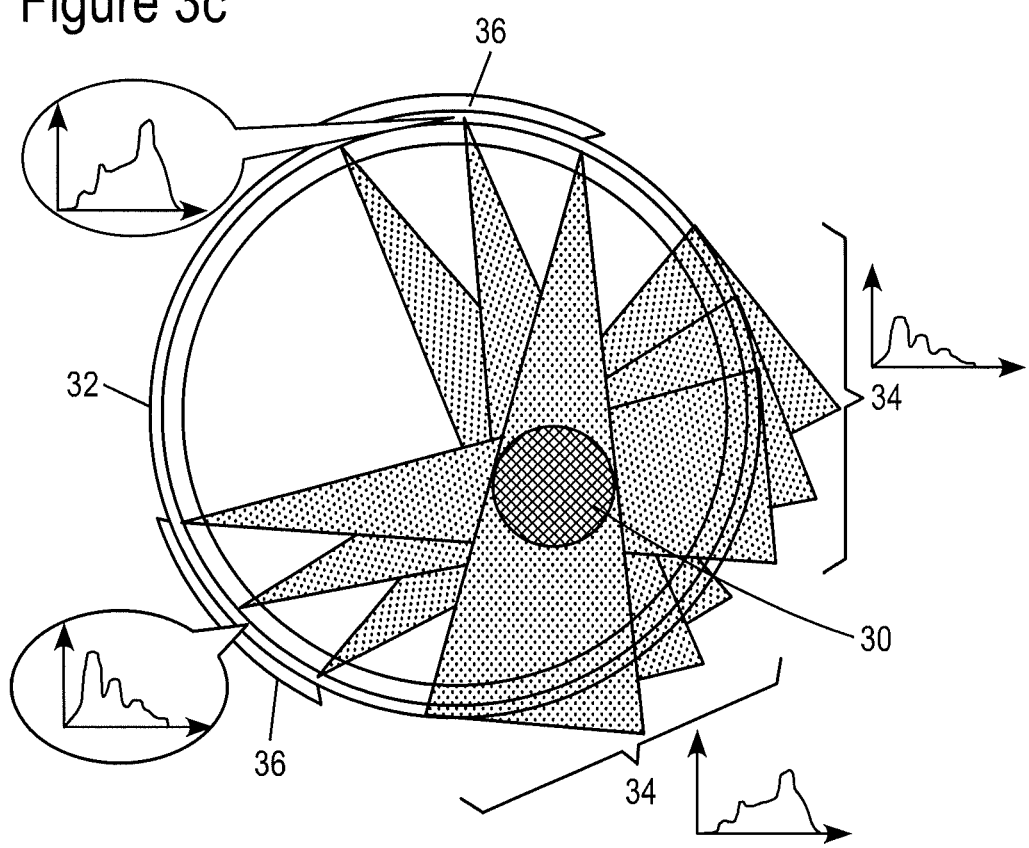

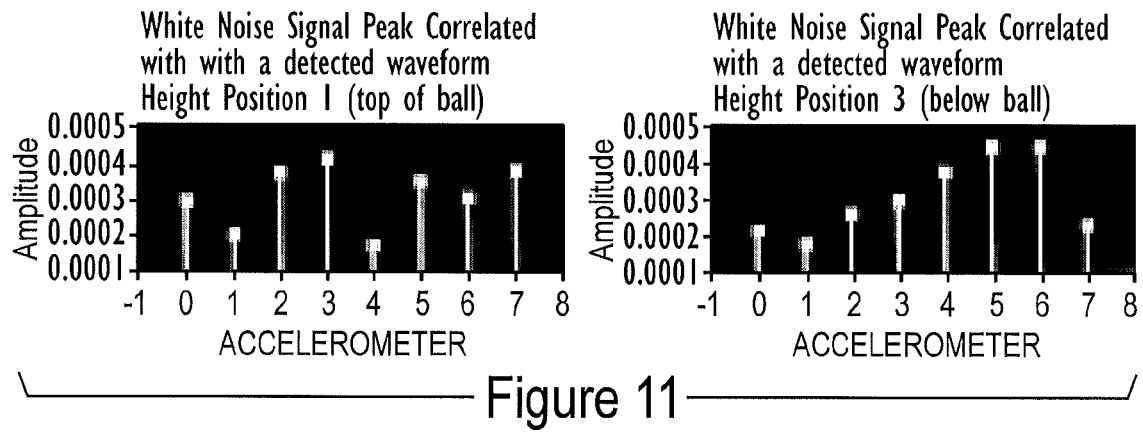
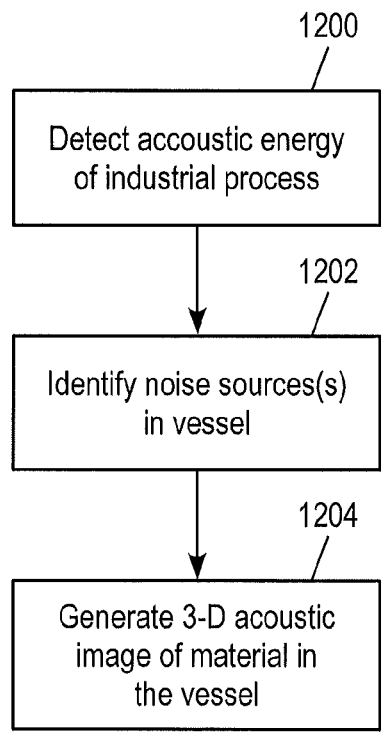
Figure 11
Figure 12

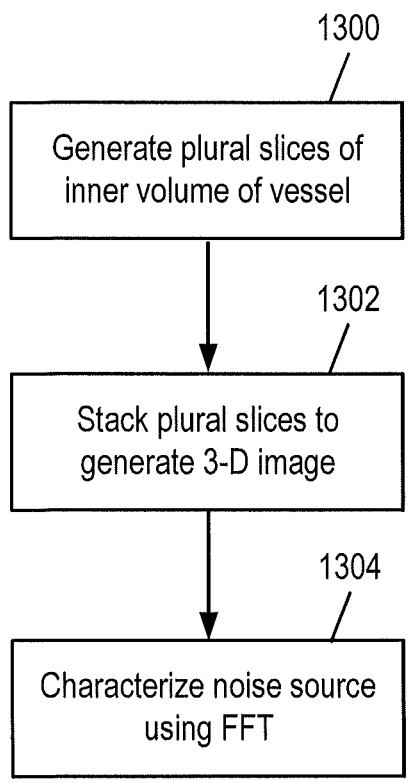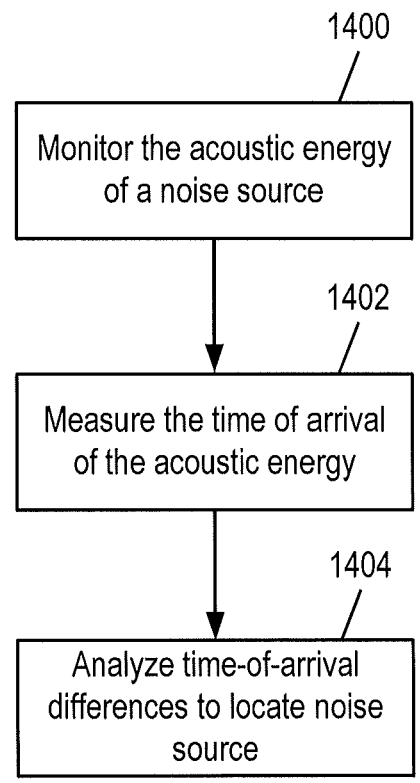
Figure 13
Figure 14

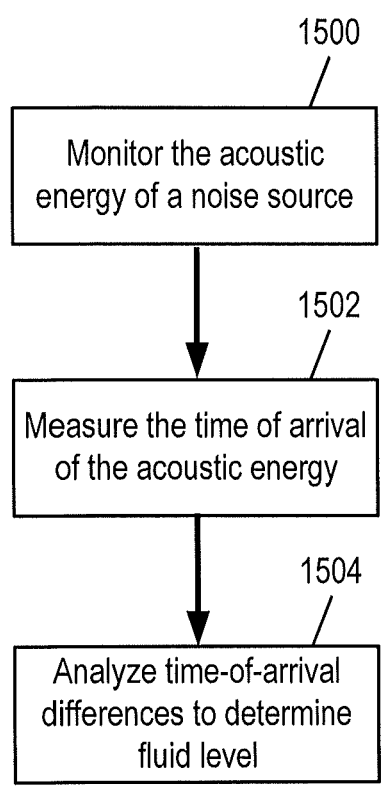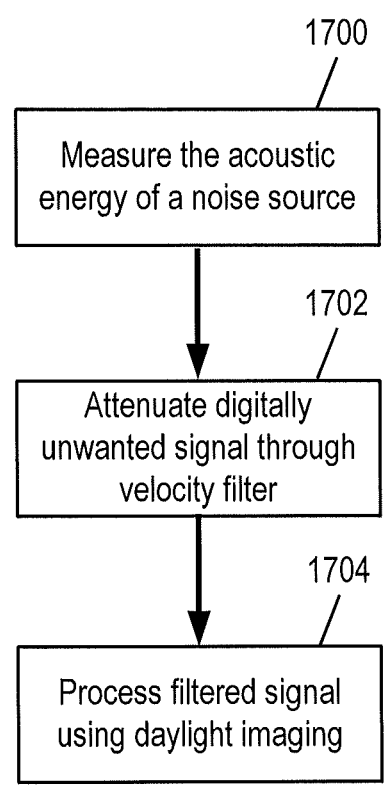
Figure 15
Figure 17

INDUSTRIAL PROCESS MONITORING AND IMAGING

FIELD

The disclosed embodiments are directed to systems methods and arrangement for monitoring and imaging a process inside a vessel, such as a coker vessel. In particular, the arrangement may use a distributed acoustic sensor that provides a large number of sensing elements on a length of optical fiber attached to the surface of a vessel.

BACKGROUND

Acoustic detection has been proposed for condition monitoring in industrial process applications. In these conventional applications, a number of acoustic sensors can be placed on the outside wall of the vessel to detect acoustic emission generated by different components. The acoustic emissions can be processed to generate an acoustic profile, which may be used to detect the existence of an acoustic anomaly, caused by a leak, change in process node, change in the phase of a component, or other characteristics of the industrial process as desired. These applications have limitations, however, in an ability to generate images of the internal volume of the vessel from the acoustic emissions detected by the sensors. Image generation can also be constrained by the environmental and structural characteristic of the industrial process and vessel. In some configurations, the vessel can include a thick outer wall, which greatly limits and/or prevents the monitoring of the process inside the vessel.

For example a coking operation is a refining technique for generating oil and petroleum products from non-uniform residual feedstocks. In a delayed coking operation, a residual oil feed is heated in a furnace with multiple parallel passes to its thermal cracking temperature. The heating cracks the heavy, long chain hydrocarbon molecules of the residual oil into coker gas oil and petroleum coke.

The coking process can present a number of undesired conditions. One such condition involves the formation of hot-spots. A hot-spot is typically an egg-shaped volume of coke on the order of a few feet in diameter, which has a hard, non-porous shell. The hot-spot can retain heat because water does not penetrate the shell during a quenching process. During a quenching process, water is introduced into the vessel to cool the coke material. That is, when the coking vessel is substantially filled with solidified coke, the vessel is steamed to further reduce hydrocarbon content of the petroleum coke. In a next step, the material in the vessel is cooled by quenching with water. The top and bottom heads of the coke drum are removed, and the solid petroleum coke is then cut from the coke drum with a high pressure water drill. When the water drill hits a hot-spot, thermal energy can be released through the opening at the top of the vessel.

U.S. Pat. No. 5,517,537 A describes an acoustic leak detection system that maps acoustic noise in a three-dimensional acoustic noise field for leak detection. Acoustic sensors are coupled to the external vessel walls of a steam generator and chemical sensors are placed inside the vessel to monitor the hydrogen content of liquid sodium and a cover gas. The externally mounted sensors monitor the acoustic pressure within the steam generator vessel by measuring the wall motion resulting from the impact of acoustic pressure waves. The system extracts acoustic pressure waves that result from a leak (e.g., due to a sodium-water reaction) inside the vessel. This detection scheme is limited to locating a leak in the absence of large background noise and cannot be used to image an internal volume of the vessel.

US 2007/0038393 A1 discloses a system that proposes monitoring the status of a cutting tool and the level of coke in a drum during a delayed decoker unit operation. Plural sensors are coupled in vertical and horizontal orientations to a component of the coker unit, such as outside the drum, on the drill stem, a fluid line, and/or a fluid pump. The data collected by the sensors are output the data to a computer. When the drum is off-line, the drill is in boring mode, and water is ejected from high pressure nozzles to cut a bore hole through solid coke in the drum, each sensor measures vibrations produced because of the process. The collected data from each sensor can be amplified, calibrated, and/or transformed using a Fast Fourier Transform (FFT). The resulting wave can be used to create a fingerprint of the boring process, and when the coking process is operational, the data collected by each sensor can be analyzed to monitor the cutting tool and/or determine the mode, such as ramping, cutting, and drilling, for example. While this system can monitor the coke levels inside a coke drum and detect a position of the drill, it does also not provide a capability to image the coking process within the drum.

Each of the prior art disclosures are hereby incorporated by reference in their entirety.

Given the known art there is a need for a system, method, and arrangement that can image the inner volume of a vessel associated with an industrial process and detect the physical and chemical features of a medium in the vessel, which is acted on by the industrial process.

SUMMARY

An exemplary embodiment of the present disclosure is directed to an apparatus for imaging a volume of material contained inside an enclosure. The apparatus includes a plurality of synchronized acoustic sensors positioned at a periphery of an inner volume of the enclosure, to sense acoustic energy emanating from the material in the enclosure during an industrial. A processor that combines an output of each of the acoustic sensor to identify at least one ambient noise source generating a noise field that illuminates an inner volume of the enclosure and to produce image data of the material by temporal and spatial coherent processing of the transmission and reflection of the noise field generated by the noise source.

Another exemplary embodiment is directed to a method of imaging material in an inner volume of a vessel using velocity and/or spatial filtering techniques to reduce the surface acoustic effect of the vessel wall and measure more effectively the acoustic energy emitted within the vessel. The method includes detecting acoustic signals generated by the industrial process through a plurality of synchronized sensors positioned at a periphery of an inner volume of the enclosure, the outputs of which are combined to form an acoustic image of the material inside the vessel. At least one noise source generating a noise field that illuminates the volume of a material inside the vessel, and an acoustic image of the material is generated by temporal and spatial coherent processing of the transmission and reflection of the noise field generated by the noise source.

A further exemplary embodiment is directed to a method of level detection in an enclosure. The method includes detecting characteristic acoustic signals of the industrial process through a plurality of time-synchronized sensors disposed about an axis of the enclosure. A time of flight of one of the detected acoustic signals is measured at each one of the plurality of sensors, and the time of flight of the detected acoustic signals measured at each one of the plurality of sensors is analyzed to determine a fluid level in the enclosure.

Another exemplary embodiment is directed to a method of detecting an object in an enclosure. The method comprises detecting characteristic acoustic signals of an industrial process acting on a material within the enclosure through a plurality of time-synchronized sensors disposed about a periphery of an inner volume of the enclosure, and measuring a time of flight of one of the detected acoustic signals at each one of the plurality of sensors. The time of flight of the measured acoustic signals at each of the plurality of sensors is analyzed to determine a size and location of an object in the material acted by the industrial process in the enclosure.

Additionally, an exemplary embodiment is directed to a computer readable medium containing a program which when compiled on a computer causes the computer to execute a process of imaging material in an inner volume of an enclosure of an industrial process. The method performed by the computer includes synchronizing acoustic signals received from a plurality of sensors disposed at a periphery of the inner volume of the enclosure, and generating a plurality of two-dimensional images of the inner volume of the enclosure based on the synchronized acoustic signals. The synchronized acoustic signals are associated with characteristics of the material in the industrial process. The method also includes identifying at least one source of the synchronized signals in the enclosure, and stacking the plurality of two-dimensional images to generate a three-dimensional image of the inner volume of the enclosure.

BRIEF DESCRIPTION OF THE DRAWINGS

In the following, exemplary embodiments of the invention will be described in greater detail with reference to the drawings, wherein:

FIGS. 3a-3c are graphical illustrations of acoustic transmission imaging using a distributed fiber sensor in accordance with an exemplary embodiment;

FIG. 11 is a graphical illustration of a cross-correlation between sensors in a sensor array of the fourth example in accordance with an exemplary embodiment;

FIG. 12 is a flowchart of a method of imaging an inner volume of a vessel in accordance with an exemplary embodiment;

FIG. 13 is a flowchart of a mapping technique for identifying noise sources in a vessel in accordance with an exemplary embodiment;

FIG. 14 is a flowchart illustrating a time-of-flight measurement for noise source location in accordance with an exemplary embodiment;

FIG. 15 is a flowchart illustrating a method of level detection in a vessel in accordance with an exemplary embodiment;

FIG. 17 is a flowchart of a method for eradicating structure borne signals on the vessel in accordance with an exemplary embodiment.

DETAILED DESCRIPTION

Figure 1:
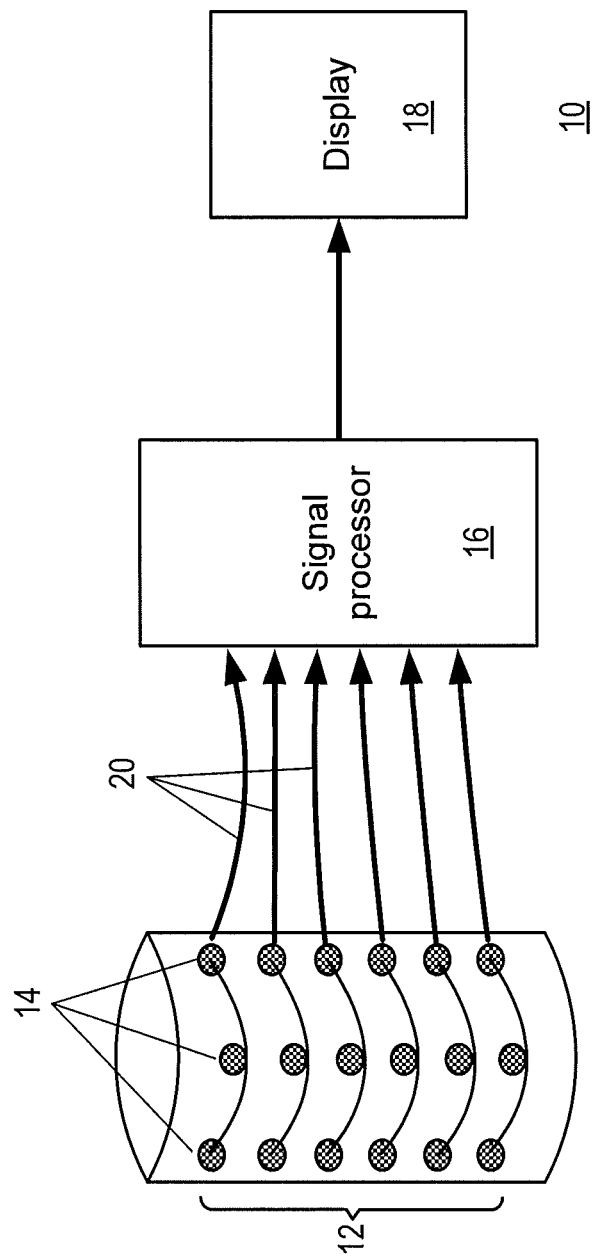
FIG. 1 illustrates an apparatus for monitoring a vessel using acoustic sensors in accordance with an exemplary embodiment.

As provided in the present disclosure, a "vessel" is used to describe any enclosure, such as a pipeline, conduit, well, reservoir, tank, cylinder, tower, drum, container, or any other suitable structure as desired, which can be used to process and/or store material, such as a fluid, substance, object, or any other composition of matter that can be used in an industrial process or acted on by an industrial process. The term "industrial process" describes any step in a procedure for refining, manufacturing, producing, or otherwise changing the composition, phase, physical and/or chemical characteristics of a material or fluid. The term "emanate" is used to describe the manner in which acoustic energy is generated, transmitted, and/or reflected by the material in the vessel. As used herein, "ambient noise" is used to describe the acoustic energy generated naturally within a vessel during the course of an industrial process. The acoustic energy can be generated as time-varying pulses, pings, or other measurable or observable acoustic energy having an intermittent characteristic generated in the vessel as desired.

An environment in a vessel of an industrial process can be acoustically noisy. The coker environment in particular is an environment replete with dynamic physical and acoustic characteristics. For example, during the coking operation a vessel can contain a multi-phase material and be characterized as noisy, large, high temperature, and optically opaque. Ambient noise includes the noise emanating from numerous sources within the vessel during the industrial process. These sources can be generated during various phases and/or operating modes of the industrial process. The operating modes can include but are not limited to the filling and draining of the vessel, the heating or cooling of the vessel, and the stripping, drilling, quenching, decoking, spalling, or other suitable process performed on material in the vessel as desired. During such processes, the material in the vessel can undergo various chemical and physical changes that generate and emit acoustic energy. The acoustic energy forms a noise field that surrounds and immerses any object located within the vessel. Based on the object's shape, composition, and location, the noise field can be modified in much the same way as an object in air or the atmosphere reflects and scatters light.

Seismic daylight imaging is a processing approach that manipulates noise emanating from a selected source to produce images in a manner that is similar to the manner in which the eye uses uncorrelated scattered light to produce images. This imaging technique uses a multitude of tight acoustic beams directed in both the horizontal and vertical directions using adaptive methods. The noise content within each beam is analyzed and the information is used to generate a pixel for display. Directions in which there are lower ambient noise levels correspond to directions in which objects interfere with the acoustic beams, and are therefore indicative of the presence of an object.

In accordance with exemplary embodiments discussed herein, the material, such as a fluid, substance, object, or any composition of matter, which can be used in an industrial process that is being monitored or observed, is non-specific such that it can be in any of various physical forms, shapes, and/or sizes and can include any of various chemical compositions and/or properties as desired. In the coker environment, for example, an object such as a hot-spot egg can embody acoustic properties that are different from those of the surrounding coke. As a result, the hot-spot egg can modify the noise field with respect to acoustic impedance. These modifications include energy reflection, acoustic attenuation, or transmission of a modified field. The attenuated signals can generate shadows in the analyzed noise field, which define the location of the egg.

In addition, a boundary between different phases (e.g., solid, liquid, plasma, gas) of coke inside the vessel can modify the noise field such that an acoustic impedance mismatch is detected. The exemplary embodiments disclosed herein are directed to passive acoustic transmission imaging systems and methods which can detect the variations in these acoustic properties to locate, identify, and produce an image of a hot-spot or other object within a process vessel in real-time as desired.

As described herein, these acoustic monitoring and imaging methods, which can take advantage of the ambient acoustic noise, include a combination of seismic daylight imaging and seismic interferometry techniques. As should be readily apparent, the passive acoustic methods provided in the exemplary embodiments of the present disclosure are different from conventional acoustic imaging systems in that the exemplary embodiments can detect the presence of objects in a vessel using the ambient or background noise generated by ambient sources during an industrial process to detect acoustic anomalies produced by objects immersed in the sound field illuminating the inside of the vessel.

In an industrial process, such as the coking environment, a hot-spot, tar ball, or other material form within the coker vessel can have different acoustic properties, such as speed of sound and acoustic attenuation, than the surrounding coke based on a respective shape, composition, and location of the material form. Using the exemplary methods described herein, any acoustic anomalies related to changes in velocity or attenuation of the acoustic energy in the vessel can indicate and/or identify the presence and location of a hot-spot and be used to generate an image of the hot-spot within the vessel.

An exemplary embodiment uses an acoustic transmission imaging arrangement in which multiple time-synchronized sensors are placed at a periphery of an inner volume of the vessel, such as on an outer region of the vessel, an outer surface of the vessel wall, an inner surface of the vessel wall, or any other location outside a region of the inner volume of the vessel from which acoustic energy emanates as desired. The inner volume can be any internal portion or internal structure of the vessel that surround, encases, or contains the material acted on by the industrial process. The sensors can be used to monitor the ambient noise field in the vessel and detect a noise source. The noise sources inside the vessel are ambient sources, which naturally or characteristically generate acoustic energy when the coker vessel is on-line during an industrial process. Through signal processing algorithms described in further detail below, each ambient source can be mapped to a location in the vessel so that during operation, the acoustic energy emanating from a respective source can be measured along different and direct paths to a sensor mounted on the surface of the vessel. Paths that receive "slow" acoustic waves indicate that there is a hot-spot along that path.

The frequency at which the noise travels through the vessel depends on the characteristics or phase of the material contained within the vessel. The material contained in the vessel can have multiple layers wherein each layer can be of a different phase. For example, the sound speed in foam as a function of frequency is driven by a bubble size distribution of the coking material in the vessel. Acoustic energy traveling through the material can have differing speeds depending on the bubble size and/or phase of the material in which the energy is located. Various sound speed gradients can be evident at the interface of each layer of the material given the phase of each respective layer. The exemplary embodiments disclosed herein can detect the variations in the ambient noise field to detect a level or phase(s) of the material contained in the vessel at various modes of an industrial process in real-time.

FIG. 1 illustrates a system for monitoring a vessel using acoustic sensors in accordance with an exemplary embodiment. The apparatus 10 includes a sensor array 12 having a plurality of sensors 14, a signal processor 16, and a display 18. Each sensor 14 of the sensor array 12 can be an acoustic sensor, such as a microphone, accelerometer, fiber optic accelerometer, or other suitable discrete means for detecting acoustic energy at a specified point at a periphery of the inner volume of the vessel as desired. As an accelerometer, each sensor 14 can be implemented as a piezoelectric transducer, potentiometric transducer, a reluctance accelerometer, a capacitive accelerometer, or any other type of electromechanical device suitable and robust for sensing acoustic energy in an a coking environment or other industrial process. The sensors 14 detect acoustic energy inside the vessel and output an electrical signal to the signal processor 16. The sensor array 12 can be rigidly mounted or attached to a housing, shell, or outer surface of the vessel in an arrangement such as an array. The sensors can be arranged in any number of array shapes, such as in a spiral, helical, double helical, or other shape suitable for generating a two-dimensional (2-D) or three-dimensional (3-D) image of an inner volume of the vessel.

The sensors 14 in the array 12 can be synchronized in time using a common clock signal. The detected signal from each sensor is encoded and sent to the processor for further temporal and spatial processing. The processor also takes into account any signal time delay connection introduced between the sensors located around the vessel. The number and arrangement of discrete sensors 14 in the sensor array 12 can be specified based on a suitability for imaging an entire inner volume of the vessel and/or detecting and locating objects or noise sources contained inside the vessel as desired. The positioning of the discrete sensors in the array can be such that a circumferential distribution among the sensors along an axis of the vessel is uniform. In addition, the output of a group of sensors may be combined to improve the signal-to-noise measurement using beamforming to enhance the directional sensitivity of the received acoustic signals. It should be readily apparent that in some applications other arrangements or patterns can be used to suit a given environment.

In an exemplary embodiment, the signal processor 16 can receive an output of each sensor 14 on a dedicated channel 20. Each channel 20 can be implemented as a separate line, a separate frequency, a separate encoding, or in any other scheme suitable for transmitting the signals as desired. The signal on each dedicated channel can be time-synchronized with a signal on another dedicated channel so that the acoustic energy received at different locations around the vessel can be cross-correlated and/or coherently processed together. The signal processor 16 digitizes the signals and process the digitized signal through a Fast Fourier Transform and/or wavelet transform. The digitized signals can be combined to map at least one noise source of the industrial process illuminating the inner volume of the vessel and to generate image data, which can include data for producing and/or the data included in a graph, chart, a two-dimensional (2-D) and/or three-dimensional (3-D) acoustic image, or other suitable manner of displaying characteristics of the acoustic energy emanating from a noise source within the vessel, by temporal and spatial coherent processing of the transmission and reflection of the noise source. This processing is achieved by detecting and locating the noise sources that illuminate the inside of the vessel. Once the noise sources are determined, the signals detected by the sensors are cross-correlated to determine the temporal and spatial coherence of the signals to identify objects and/or characteristics of the material in the vessel.

The signal processor 16 can be a processor, computer system, programmable controller, or other suitable data processing device as desired. For example, the signal processor can be a computer system, such as any combination of a personal computer, notebook computer, hand-held electronic device, workstation, multiprocessor system, network computer, or other suitable device. The signal processor 16 can include a data processing component, memory (Random Access Memory, Read Only Memory), a programmable logic array, a field programmer gate array, a system bus that can include one or a plurality of bus architectures, a graphics processing unit, a plurality of input interfaces, and a plurality of output interfaces. The signal processor can execute computer readable instructions for performing an algorithm to achieve the signal processing operations for imaging an inner volume of a vessel. The computer readable instructions can be stored or encoded on a computer-readable medium such as a magnetic hard disk, removable magnetic disk, a flash disk drive, magnetic cassette, optical disk, or other suitable tangible media as desired.

The display 18 can be connected to receive output data from the signal processor 16. Based on the received data, the display can generate a visual representation of the inner volume of the vessel based on the acoustic energy detected by the sensor array. The display can be in the form of signal diagram, contour image of a noise source or object in the vessel, or other suitable representation of the received data as desired.

The passive noise sources can be identified by generating a map of the detected acoustic signals in the inner volume of the vessel, and associating the mapped acoustic signals with characteristics of the material acted on by the industrial process and/or characteristics of the industrial process. The noise sources can be mapped by simultaneously collecting data from the time-synchronized sensors placed around the drum. The signals from each sensor can be delayed with respect to one-another and added to monitor each point in the vessel associated with each respective sensor. For example, when a passive noise source within the vessel emits acoustic energy the energy is detected by a first sensor. When the first sensor detects acoustic energy, a timer is initiated to measure the amount of time that elapses before the acoustic energy emitted from the noise source reaches another sensor in the sensor array 12. This time difference recorded and the process can be repeated for each sensor to locate the noise source through triangulation using multiple sensors increases resolution and resolves ambiguities.

In another exemplary embodiment, reflected energy in the noise field can also be used to locate hot-spots. In reflection imaging, data is collected simultaneously from all sensors as acoustic energy is emitted from each passive source. As discussed above, the boundary between a hot-spot and other forms of coke will cause an acoustic impedance mismatch, such as the acoustic energy traveling at different speeds or being attenuated. Any acoustic impedance mismatch will cause the acoustic energy to be reflected from the hot-spot back to the source. The size of the reflection can be used to indicate a boundary between different materials, such as different phases or forms of coke.

The reflected and non-reflected acoustic energy from a passive source can be processed using the known methods of seismic interferometry. As described in Seismic Interferometry, Schuster, GT, Cambridge: Cambridge University Press, 2009, p. 260, a direct wave (sA) can be denoted as $$\tilde{d}_A = e^{j\omega \tau_{sA}} \tag{1}$$

The reflected wave can be described by $$\tilde{d}_B = R^2 e^{j\omega(\tau_{sA}+\tau_{Ar}+\tau_{rB})} \tag{2}$$

where $\tau_{ij}$ indicates propagation time along the path ij, R is the reflection coefficient between two layers, and $\omega$ is the angular frequency. An interferogram can be represented as the net intensity of the direct and reflected waves:

$$I = (\tilde{d}_A + \tilde{d}hd\, B)(\tilde{d}_A + \tilde{d}_B)^* = 1 + 2R^2 \cos(\omega(\tau_{Ar}+\tau_{rB})) + R^4 \tag{3}$$

such that the intensity pattern can be controlled by the phase contained within the cosine term $\omega(\tau_{Ar}+\tau_{rB})$. This term is independent of the phase of the position of the source along sA. This methodology can be expanded for application in the seismic domain with regard to sensor signal time-history at two locations A and B. The conjugate of two signals A and B can be multiplied to obtain $$\tilde{\phi}_{AB} = \tilde{d}^*_A \cdot \tilde{d}_B = Re^{j\omega(\tau_{Ar}+\tau_{rB})} + o.t. \tag{4}$$

where $\tilde{\phi}_{AB}$ denotes the product spectrum, and the exponential represents the correlation of the direct wave at A with the ghost reflection at B, and o.t. indicates other terms such as the direct-direct or reflected-reflected wave correlations. The principal equation for $\tilde{\phi}_{AB}$ is dependent solely on the phase interference function $\omega(\tau_{Ar}+\tau_{rB})$. The object of this method is to retrieve the reflector geometry by applying a migration kernel $e^{-j\omega(\tau_{Ar}+\tau_{rB})}$ to $\tilde{\phi}_{AB}$. The signals received at the sensors are correlated with one another and migrated using the migration formula $$m(x) = \frac{1}{k} \sum i \sum j \sum k \ddot{\phi}(i, j, \tau_{ix} + \tau_{xj})^{(k)}, \tag{5}$$

where $\phi$ indicates the cross correlation, the double-dot indicates the second derivative, $\ddot{\phi}(i,j,t)^{(k)} = d(i,t)^{(k)} \otimes d(j,t)^{(k)}$, $d(i,t)^{(k)}$ is the trace at time t recorded at the ith position. Passive data are windowed into K overlapping segments, and the kth segment is denoted by the subscript k.

In another exemplary embodiment, changes in acoustic attenuation can be used to locate and image hot-spots. During the cooling phase of the coking process, a hot-spot can remain in liquid phase for a period while the surrounding material is solid. Because liquids cannot support an acoustic shear wave, a shear wave shadow, which is the total attenuation of the acoustic shear wave, can be produced along a path containing a hot-spot. For example, if a passive source in the vessel emits acoustic energy, a noise signal from the passive source can be received at a sensor on the vessel along a first path. This first path signal is compared with a noise signal from the passive source that can be received at a sensor on the vessel along a second path. If, for example, the first path signal is detected by a sensor and the second path signal is not detected by a sensor, then a hot-spot or other material form is likely present in the second signal path.

In another exemplary embodiment, an acoustic transmission imaging technique can be implemented using a distributed fiber optic acoustic sensor. The distributed fiber sensor can have a higher sensor density than a sensor array with individual point sensors. The fiber sensor can be wrapped around the external wall of the vessel in a pattern suitable for imaging the entire vessel such as omega, double omega or other shape suitable for generating two-dimensional (2-D) or three dimensional (3-D) images.

In an exemplary embodiment, the sensor array can be a distributed fiber optic sensor. The distributed fiber sensor can be a continuous length optical fiber that is rated to operate in high temperature environments, such as 480° C. and above, for example. Moreover, the distributed fiber sensor can be configured to measure acoustic energy every 1 m over tens of kilometers, as an example. The entire length of the fiber can be addressed simultaneously at the speed of light where all detected signals are effectively time-synchronized.

In processing the signals detected by the sensors 12, the signal processor 16 can be configured to execute an algorithm in which a contour image of a hot-spot or material inside a vessel can be obtained based on an interference pattern projected onto the array of sensors 12 when the inner volume of the vessel is illuminated by a noise source.

Figure 2:
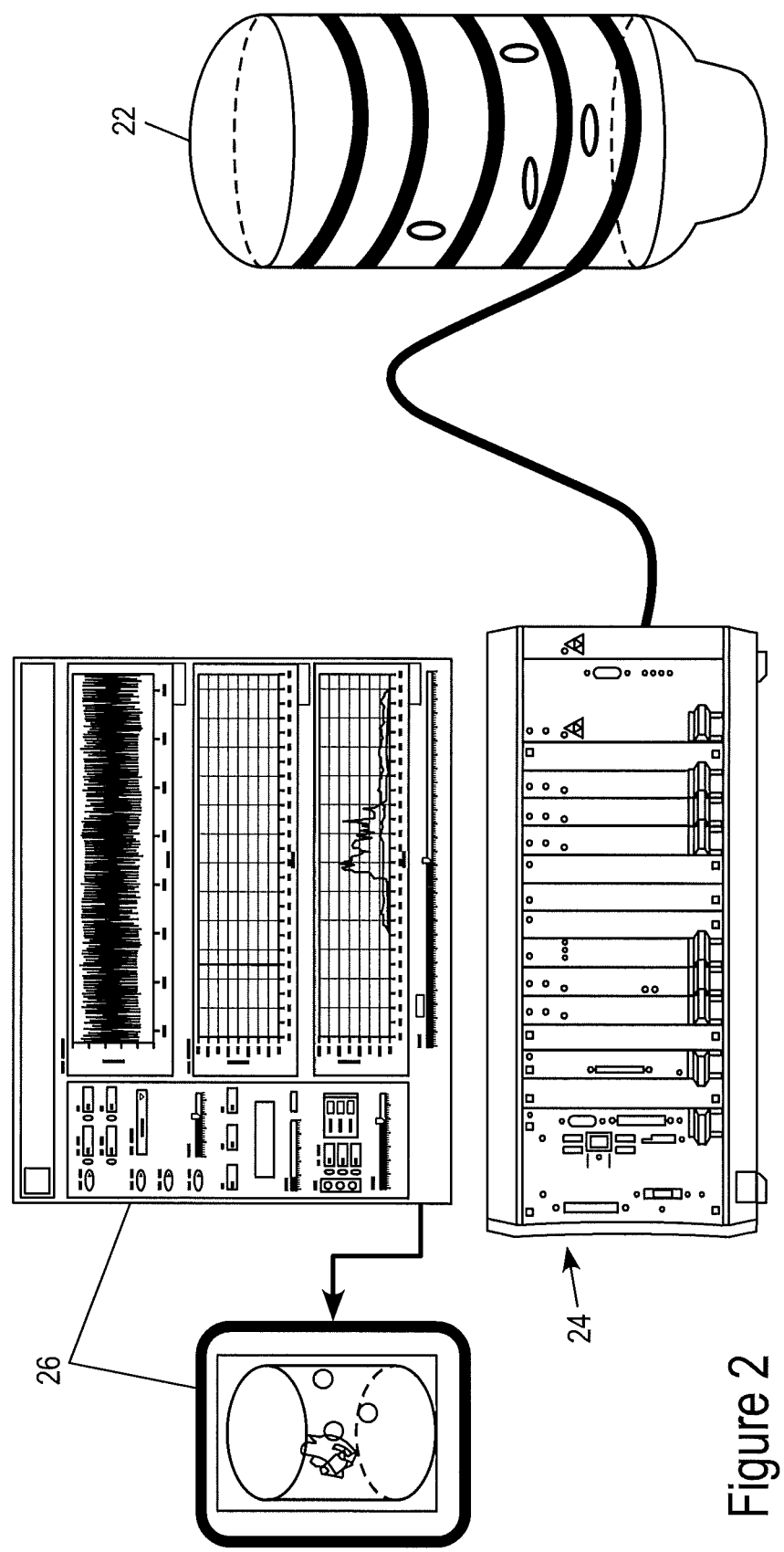
FIG. 2 illustrates a system for monitoring an industrial process inside a vessel using a distributed fiber sensor in accordance with an exemplary embodiment.

FIG. 2 illustrates a system for monitoring an industrial process inside a vessel using a distributed acoustic fiber sensor in accordance with an exemplary embodiment, such as the system described by Farhadiroushan et al. WO2010/136810 A2, which is incorporated herein in its entirety by reference. The system includes continuous length of optical fiber, such as a sensing fiber 22, which can be several kilometers in length and attached to the surface of the vessel. An optoelectronic processor unit 24 is connected to the sensing fiber. The acoustic signal perturbing the sensing fiber are measured by injecting light pulses into the sensing fiber and detecting the backscattered light modulation at several tens of kilohertz. As a result, sensing fiber 22 measures the acoustic vibration along the surface of the vessel. The fiber is flexible and can withstand high temperatures over long periods of time. The fiber can be arranged in various patterns to enhance the sensitivity and the directionality for the detection of acoustic signals as desired.

The display 26, which has feature content consistent with the display 18 illustrated in FIG. 1, can be connected to receive output data from the acoustic sensing system 24 and generate a visual representation of the received data.

As discussed previously, individual point sensors measure acoustic energy when the energy is received from a passive source along a direct or line-of-sight path. Thus, if a hot-spot or object is located outside the path or line-of-sight between the passive source and the sensor, this hot-spot would likely avoid detection. The distributed sensor, in turn, can have a much higher sensor density than a sensor array of individual point sensors and can be applied as a band around the external wall of the vessel. As a result, acoustic energy emanating inside the vessel can be monitored at a much higher resolution. In particular, as each nonspecific source within the vessel volume emits acoustic energy, the emitted signal can be detected at any point along the distributed sensor. Thus, if a hot-spot or object is present in the vessel and because the hot-spot would be immersed or surrounded by the acoustic energy emanating in the vessel then a shadow will be produced at a wall of the vessel on a side of the hot-spot that is opposite the passive noise source. The shadow that is produced by the hot-spot is a repeatable acoustic anomaly, such as acoustic energy, traveling at a different velocity or that is attenuated.

Figure 3A:
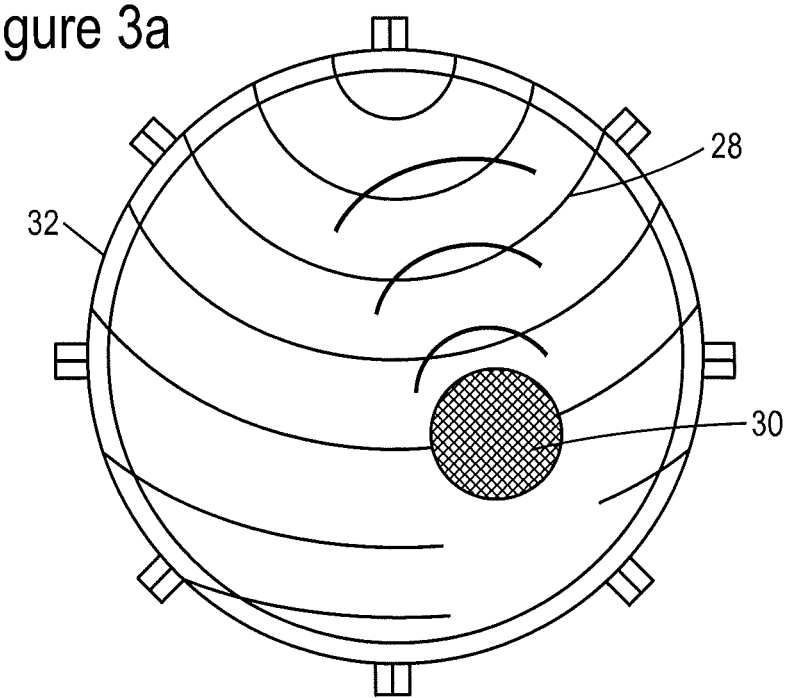
Figure 3B:
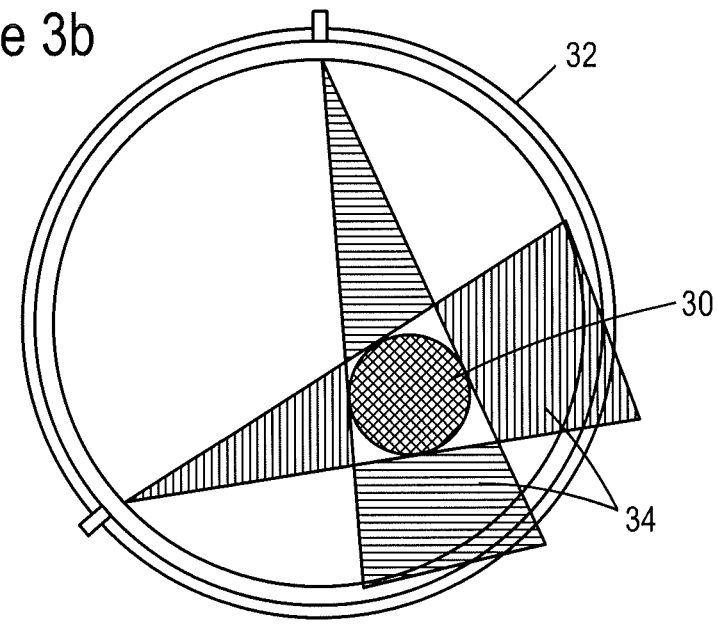

FIGS. 3a-3c are graphical illustrations of acoustic transmission imaging using a distributed fiber sensor in accordance with an exemplary embodiment. FIG. 3a illustrates the reflection and attenuation of a shear wave 28 passing through a material object 30 in the vessel 32. As shown in FIG. 3a, no acoustic energy is observed on the inner wall of the vessel 28 behind the material object 30. An acoustic shadow is produced at this location. The material object can also reflect a portion of the acoustic energy. When an acoustic shadow (i.e., a location along the fiber where acoustic energy is expected to be received from a passive source but is not received) is detected by the distributed sensor, a hot-spot can be located by extrapolating values of the acoustic energy from the shadow to the source. Hot-spots can also be detected using a number of sources. FIG. 3b is a general illustration of a hot-spot that can produce a shadow on the wall of the vessel for each passive source that emits energy within the vessel. The location of the shadow is depicted in FIG. 3b as being at the base of the cone region 34. The hot-spot can be accurately located as being within a region where the cones of each source overlap.

In another exemplary embodiment, active noise sources, which are external to sources the vessel can be used to image the contents of the vessel. Any acoustic energy produced outside of the vessel can cause the wall of the vessel to vibrate as acoustic energy passes through. This wall vibration can be considered as a virtual noise source, which can illuminate the contents of the vessel. The distributed sensor can measure the virtual noise source directly and can detect the acoustic shadows caused by hot-spots or other material forms inside the vessel. As shown in FIG. 3c, for example, virtual noise sources 36 can be attributed to two regions on the wall of the vessel. In an industrial environment, the virtual noise sources 36 can be distributed sources that have different acoustic signatures in which both the frequency components and time variations of the signals are different. The distributed sensor on the wall of the vessel measures both the virtual sources and the shadows. The signal processor 16 can compare the source and shadow waveforms to associate each shadow to a respective source. The hot spot can be imaged by extrapolating the acoustic energy from the shadow to the source. The area where the two cones 34 overlap is the area to which the hot-spot is mapped and imaged.

The exemplary embodiment of FIGS. 1 and 2 will be further described by way of the following examples in which the location of a target buried within sand-filled vessels is detected using acoustic daylight imaging.

Figure 4:
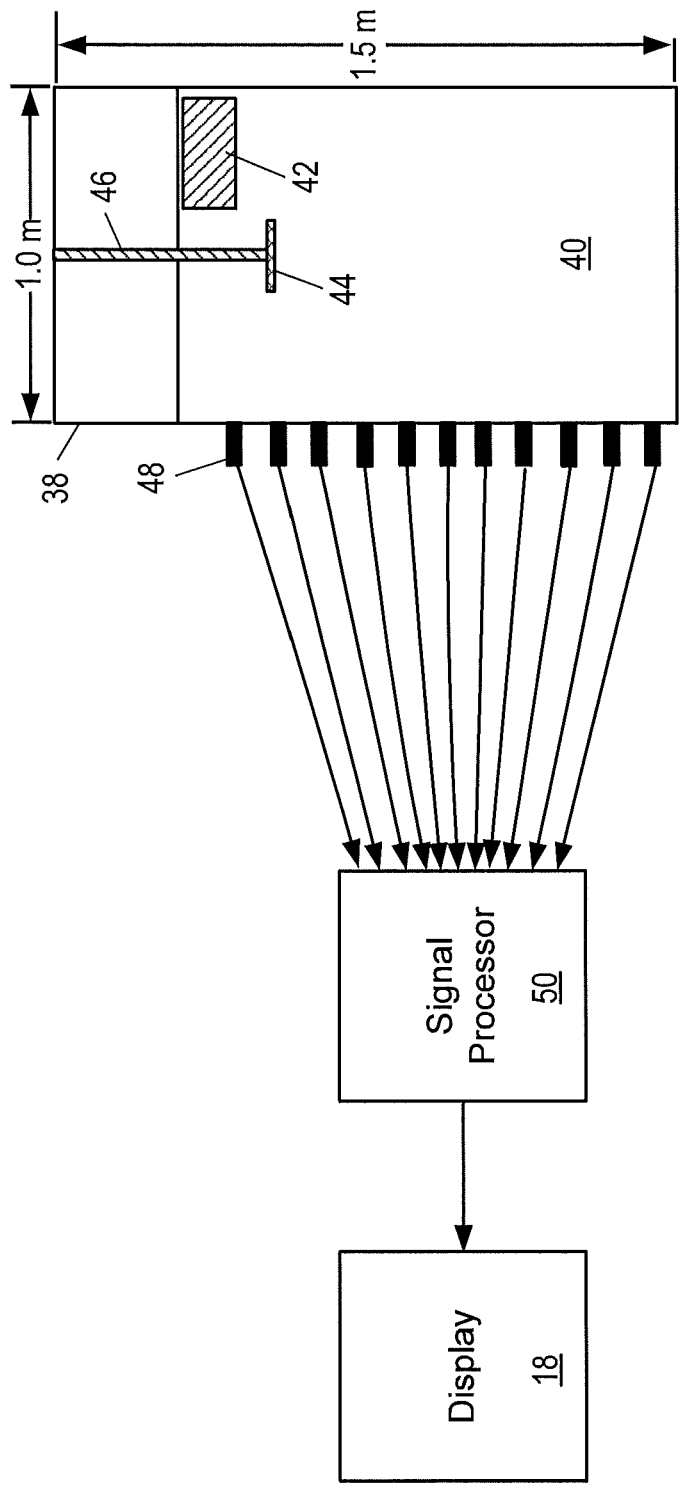
FIG. 4 illustrates a first example of a system that generates a two-dimensional image of a vessel using a low-frequency noise source illuminating inside the vessel in accordance with an exemplary embodiment.

FIG. 4 illustrates a first example of a system that generates a two-dimensional image of a vessel using a passive low-frequency noise source in accordance with an exemplary embodiment.

A vessel 38, such as a large steel drum, for example, is filled with a sand/water mixture 40 in this demonstration. The sand/water mixture 40 can be introduced into the vessel through a process that reduces and or eliminates the potential noise sources in the mixture. In this process, water is first introduced into the vessel, and the vessel was left open for a period, such as several days for example, to allow the water to degas or discharge much of the innate gas. Following the degassing, sand can be added in small quantities over a period, such as an hour or other suitable duration as desired, to minimize the number of gas pockets trapped within the sand. When the preparation of the sand/water mixture was completed, a target 42, such as a bucket, ball, or other suitable object as desired, which is approximately one fifth the largest major dimension of the drum, was placed in the same.

For example, if the tank 40 has a height of 1.5 m and a diameter of 1 m, then a maximum major dimension of the selected target 42 might be approximately 30 cm. It should be understood that the tank 40 can have any other suitable dimensions as desired. The target 42 can be placed at a position in the vessel 38, such as at approximately 25 cm from the top of the vessel 38. Given a frequency of approximately 4 kHz for a 30 cm wave, the sound speed for wet sand was specified between 750 and 1600 m/s, for example. Thus, the operating frequency for the system was approximately 4 kHz or higher, where the attenuation of the sand/water mixture is approximately 10 dB/m, for example. To ensure multiple signal paths and a nearly isotropic noise field, the signal-to-noise ratio of the source was selected to be at least 40dB above the background noise level. The noise source, such as a hand drill 44, is selected to produce the appropriate acoustic energy for this experiment. A 30 cm rod 46 can be fixed to the drill bit, and at an end of the rod, two 3 cm×3 cm metal plates can be attached. An array of accelerometers 48 was aligned vertically on the outer wall of the vessel.

Figure 5:
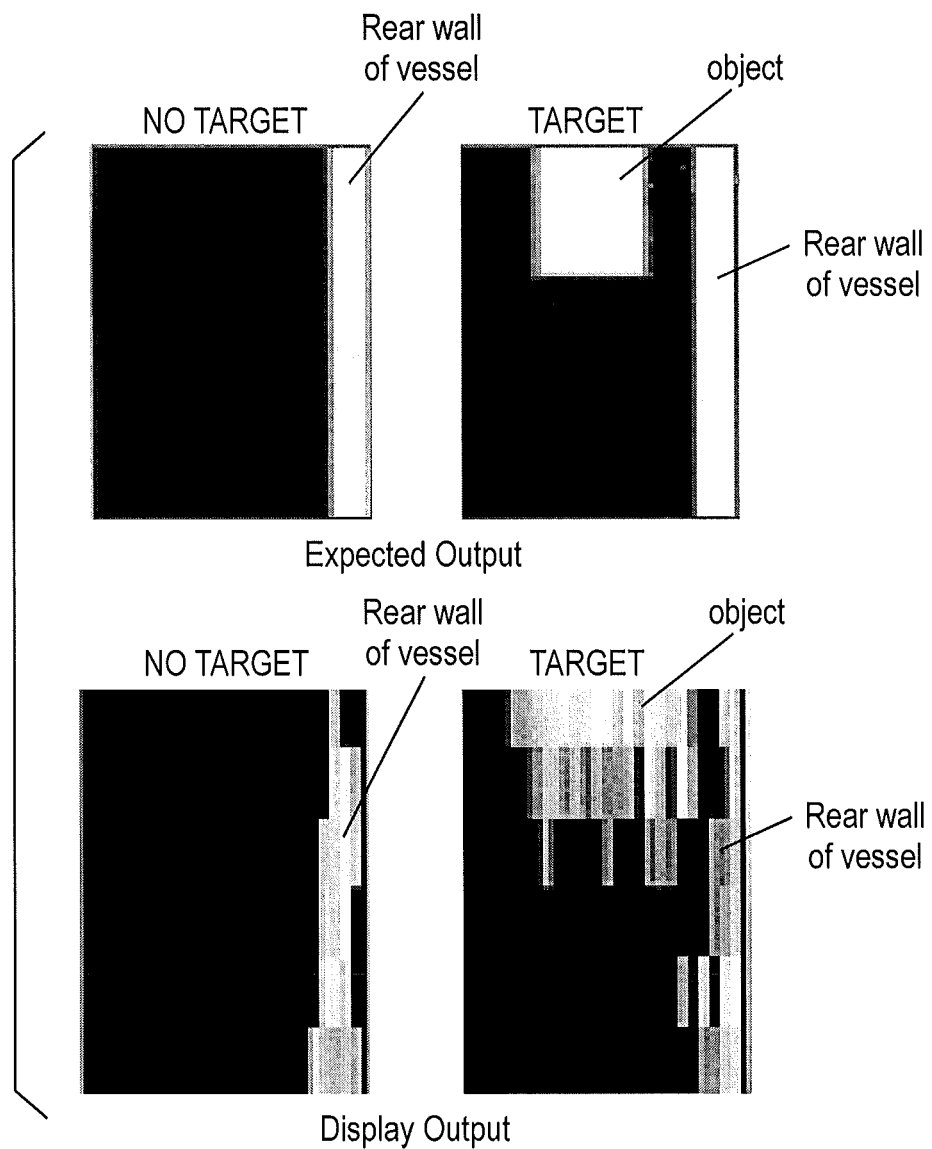
FIG. 5 is an illustration of images of the first and second operating conditions in accordance with an exemplary embodiment.

The noise source was activated under two operating conditions: the first operating condition characterized by having a selected target inside the vessel, and the second operating condition is with no target inside the vessel. Under the first and second operating conditions, the data from each sensor is processed using a combination the daylight imaging and seismic interferometry techniques discussed above to passively image the inside of the vessel based on the acoustic energy emitted by the hand drill inside the vessel. FIG. 5 is an illustration of passive images of the first and second operating conditions in accordance with an exemplary embodiment.

Figure 6:
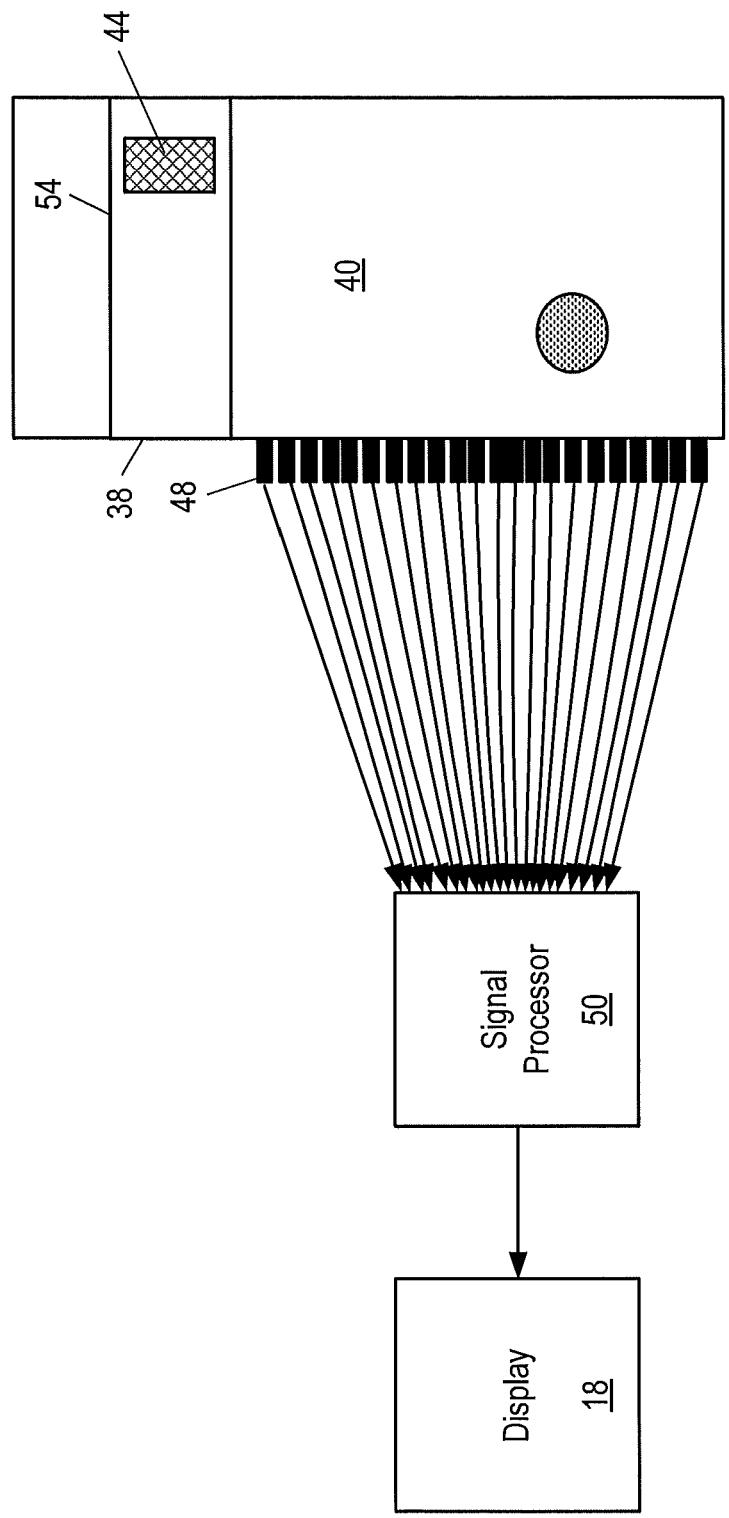
FIG. 6 illustrates a second example of an illustration of a system that generates a two-dimensional image of a vessel using a high frequency noise source illuminating inside the vessel in accordance with an exemplary embodiment.

FIG. 6 illustrates a second example of an illustration of a system that generates a two-dimensional image of a vessel using a high frequency noise source in accordance with an exemplary embodiment.

As shown in FIG. 6, the vessel is filled with a sand/water mixture. The preparation of the sand/water mixture is performed in the same manner as described above with respect to FIG. 4. The system shown in the second example of FIG. 6 is different from the system of the first example illustrated in FIG. 4, in that the spatial resolution of the sensors in the second example is half the spatial resolution of the sensors in the first example. In addition, the depth of the wet sand mixture 40 in the second example is half the depth of the sand/water mixture in system in the first example. And the sand/water interface 52 in the second example of FIG. 6 is approximately 300 mm below the air-water interface 54. In the second example, the noise source can be a broadband submersible acoustic source with a capability to produce energy levels of 7 kHz to 14 kHz. The noise source can be placed at an interstitial space between the sand-water and air-water interfaces within the vessel. The target 42 can be a ball, having a diameter of approximately 130 mm.

Figure 7:
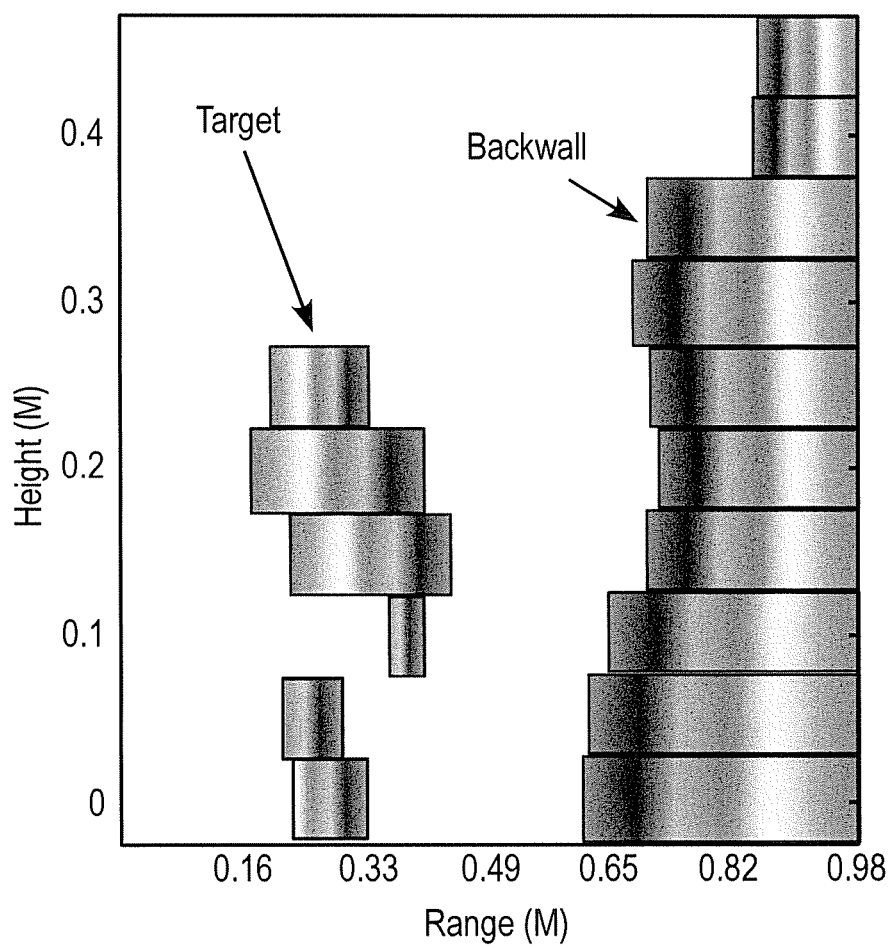
FIG. 7 is a graphical image of an output produced using the broadband noise source illuminating inside the vessel in accordance with an exemplary embodiment.

During operation, the source is driven using a pseudo-random wideband acoustic signal (250 Hz-20 kHz) representing the ambient noise sources that are typically observed in industrial process applications, The data from each sensor is processed using a combination of the daylight imaging and seismic interferometry techniques discussed above to passively image the inside of the vessel based on the acoustic energy emitted by the broadband source inside the vessel. FIG. 7 is a graphical image of an output produced using the broadband noise source in accordance with an exemplary embodiment.

Figure 8:
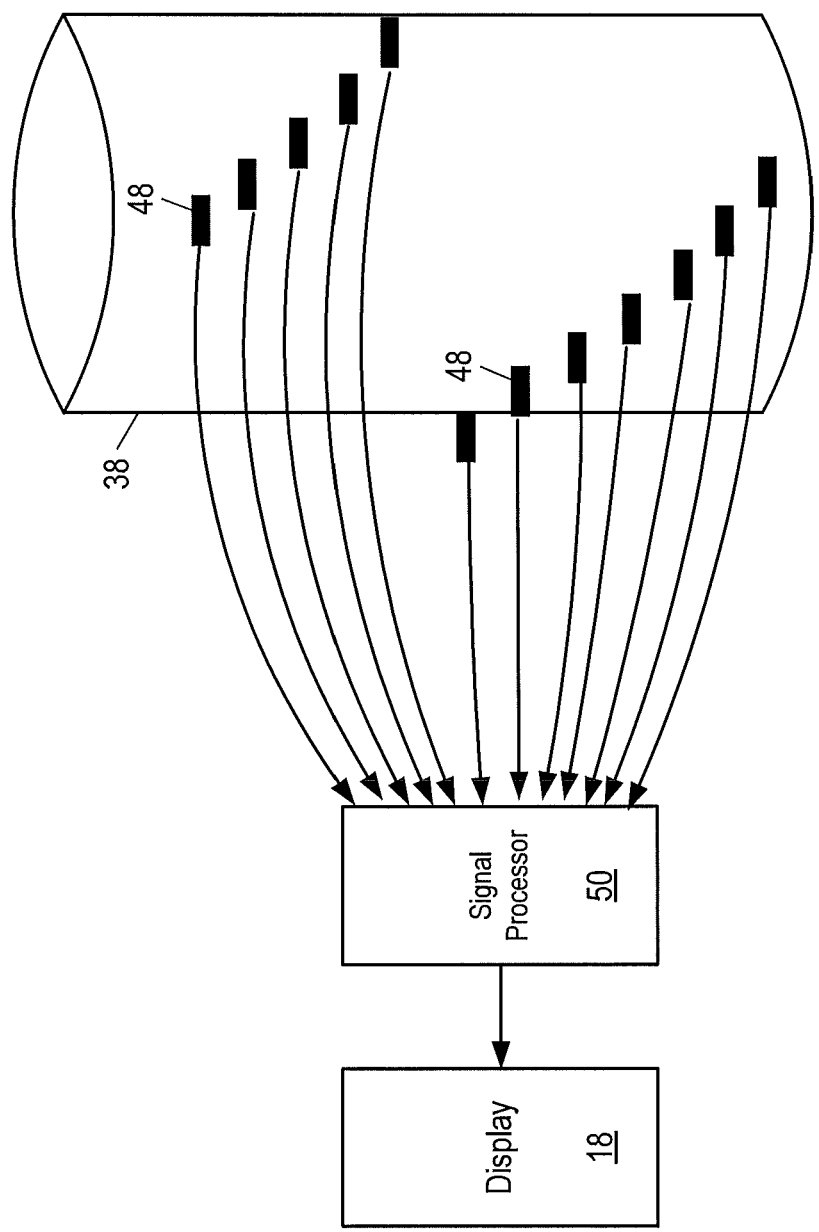
FIG. 8 illustrates a third example that includes a system, which generates a three-dimensional image of a vessel where the sensors are arranged in a double helical configuration in accordance with an exemplary embodiment.

FIG. 8 illustrates a third example that includes a system, which generates a three-dimensional image of a vessel using a time-modulated noise source in accordance with an exemplary embodiment.

As shown in FIG. 8, the system includes a vessel having, for example, a height of 1 m, a diameter of 75 cm, and a wall thickness of 6 mm or other suitable dimensions, as desired. The vessel can be a steel drum, for example, having an open top and an inlet/outlet that can be sued to drain/fill the drum. A sensor array that includes a plurality of individual sensors, such as accelerometers, was attached to an external surface of the drum. Each sensor was placed in a double-helix arrangement such that the circumferential distribution and distribution along the axis of the drum were uniform. Acoustic noise sources, such as at least one hydrophone, were placed inside the drum. The system was operated under two conditions: the first condition having sand filling a bottom portion inside of the drum, and the second condition having no sand in the drum.

In the third example, the hydrophones were activated to emit a single, short pulse having a duration less than 1 ms. As the sensors detected the acoustic energy, beamforming techniques were used to image the acoustic field. For example, a 2-D slice of the content of the vessel was generated between a respective subset of sensors in the array. The beamforming technique can be applicable to the industrial environment, and in particular, the environment in the third example because the acoustic patterns in the drum can be highly repeatable. The acoustic measurements at each sensor, therefore, can be compared with a baseline calibrated measurement, which highlights changes in the drum contents.

When the hydrophone is pulsed, each sensor can detect the pulse time through triggering and plural averages can be used to calculate a mean response. For example, data from a subset of sensors in the sensor array is compared with data from another subset of sensors in the array. If the noise signal from the source reaches each sensor in a respective subset array at substantially the same time, the sensors in the other subset array can be used to identify a difference in the signal due to the object.

Figure 9:
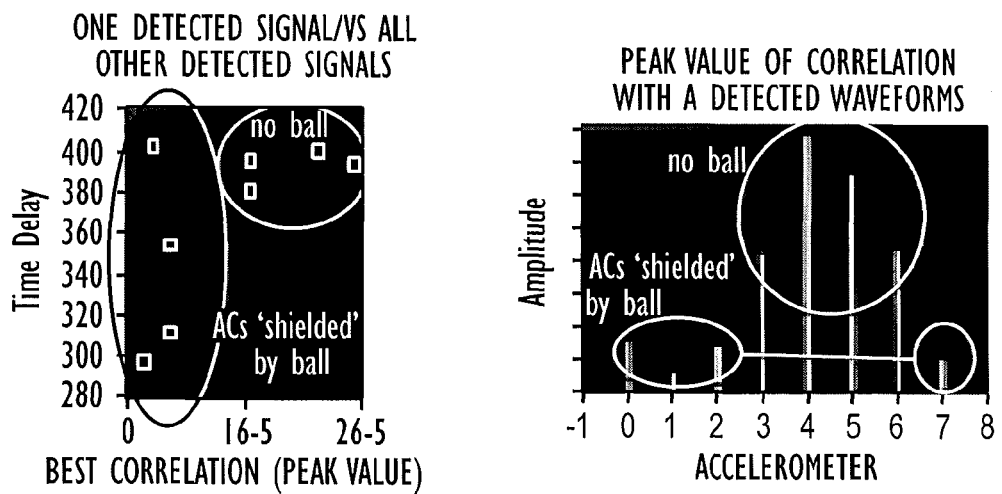
FIG. 9 is a graphical illustration of the cross-correlation measurement in accordance with an exemplary embodiment.

In another exemplary embodiment based on the systems in any of the three examples, the arrival of a pulse from the noise source, such as a hydrophone, at the sensor array can be examined by comparing the cross-correlation between signals. By recording the amplitude and time delay, of the peak correlation value, the cross-correlation measurement can indicate which signals can be affected by the presence of an object. FIG. 9 is a graphical illustration of the cross-correlation measurement in accordance with an exemplary embodiment.

Figure 10:
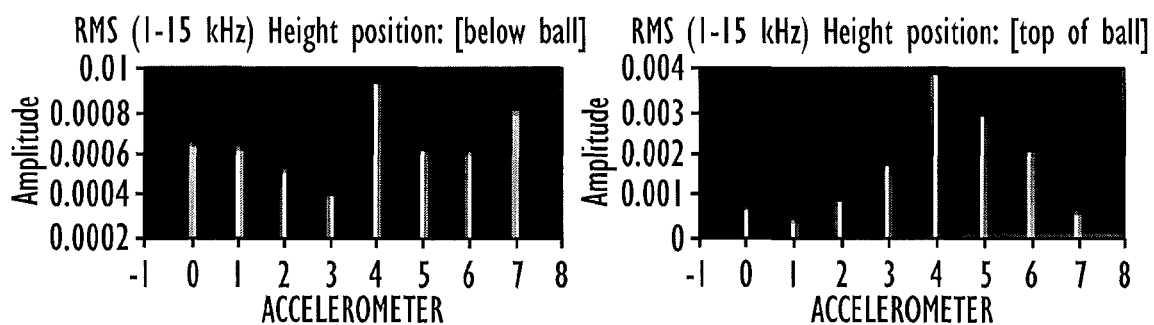
FIG. 10 is a graphical illustration of measurements from various sensors in the sensor array of the fourth example in accordance with an exemplary embodiment.

A fourth example based on the system illustrated in any of FIGS. 3a, 4, and 6 will be described. In the fourth example, a white noise signal can be emitted from a noise source, inside the vessel. A broadband signal was fed to a hydrophone, which was raised and lowered to various heights within the drum. A sensor array was arranged on an outside wall of the vessel. FIG. 10 is a graphical illustration of measurements from various sensors in the sensor array of the fourth example in accordance with an exemplary embodiment. As shown in FIG. 10, if sensor 3 is located below the ball, then the ball reduces or attenuates the amplitude of the measured signal when the hydrophone is located at a height above the ball.

Cross-correlation can be used to detect differences in coherence between signals measured by the sensors. For example, an amplitude of a reference signal (i.e., a signal received along a path where no object is located) was cross-correlated with the amplitude of each of the other signals. The maximum amplitude at the reference location can be compared with the amplitude detected at each of the other sensor locations to detect the object. FIG. 11 is a graphical illustration of a cross-correlation between sensors in a sensor array of the fourth example in accordance with an exemplary embodiment. As shown in FIG. 11, if sensor 4 is the reference signal, then the presence of the object can be located around the location of sensors 7, 0, and 1.

As discussed above, the signal processor 16 can be programmed to execute various signal processing algorithms for generating an image of the vessel contents. These algorithms will be described in detail with respect to the flowcharts illustrated in FIGS. 12 through 16.

FIG. 12 is a flowchart of a method of imaging an inner volume of a vessel in accordance with an exemplary embodiment.

In step 1200, the sensor array 12, which includes a plurality of time-synchronized sensors 14 positioned on a surface of the vessel, detects acoustic energy generated by the industrial process. Based on the detected signals, at least one noise source illuminating a volume of material inside the vessel is identified (step 1202). In the case when the sensor array is a distributed sensor fiber, if a hot-spot exists in the vessel a circular "shadow" is produced on a wall behind the hot-spot. The single distributed fiber sensor measures both the sources and the shadows, and the source and shadow waveforms are compared so that each shadow is known to belong to its respective source. A beamforming technique can be used to process the detected signals to generate image data, such as a 3-D image of material in the vessel (step 1204).

FIG. 13 is a flowchart of a mapping technique for identifying noise sources in a vessel in accordance with an exemplary embodiment. At step 1300, the signal processor 16 generates a plurality of circular slices of the inner volume of the vessel using a beamforming technique. For example, in an exemplary beamforming scheme, the signal from each sensor in the sensor array can be amplified by a different or fixed "weight." Different weighting patterns can be used to achieve the desired sensitivity patterns. A fixed set of weightings and time-delays (or phases) can be used to combine the signals from the sensors in the array, primarily using only information about the location of the sensors in space and the wave directions of interest. Each generated slice is a two-dimensional image acquired in a horizontal plane at the position of each sensor arranged on the outer surface of the vessel. The plurality of slices (2-D images) are stacked to generate a full 3-D image of the inner volume of the vessel (step 1302). The 3-D image can be analyzed to identify and locate the position of a noise source in the vessel. Once the noise source is located, the frequency components of the noise source can be analyzed using a Fast Fourier Transform or wavelet transform to characterize the source (step 1304). In particular, an acoustic fingerprint can be determined from the analysis so that the origin or cause of the noise due to the mode of the industrial process, phase of the material in the vessel, or other identifiable characteristics of the industrial process as desired objects in the vessel can be identified and logged.

FIG. 14 is a flowchart illustrating a time-of-flight measurement for noise source location in accordance with an exemplary embodiment. In step 1400, the sensor array monitors the acoustic energy of a noise source (time-varying) that illuminates the inner volume of the vessel. The signal processor 16 measures the differences in the time of arrival of the acoustic energy from the source at each sensor within the array (step 1402). The time-of-arrival differences are analyzed to determine a location of the noise source in the vessel (step 1404). For example, because a hot-spot, object, or other material form can delay the arrival of acoustic energy at a sensor location, a delay having a duration outside a specified tolerance can indicate the presence of a target in the range of the respective sensor.

The acoustic energy generated inside a vessel during an industrial process, such as a coking process, for example, can also be analyzed to determine the level of material or fluid in the vessel. FIG. 15 is a flowchart illustrating a method of level detection in a vessel in accordance with an exemplary embodiment. The sensor array monitors the acoustic energy of a noise source (time-varying) that illuminates the inner volume of the vessel (step 1500). The signal processor 16 measures the differences in the time of arrival of the acoustic energy from the source at each sensor within the array (step 1502). The time-of-arrival differences are analyzed to determine a level of the material or fluid in the vessel (step 1504).

Figure 16A:
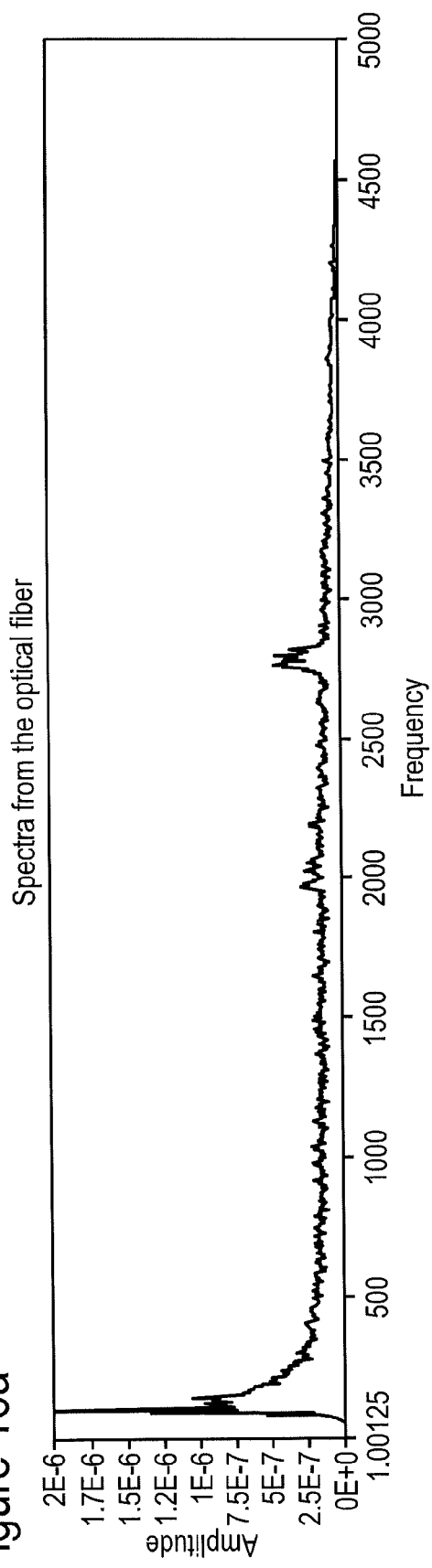
FIGS. 16a-16e are graphical illustrations of the detection of fluid level in a vessel in accordance with an exemplary embodiment.
Figure 16B:
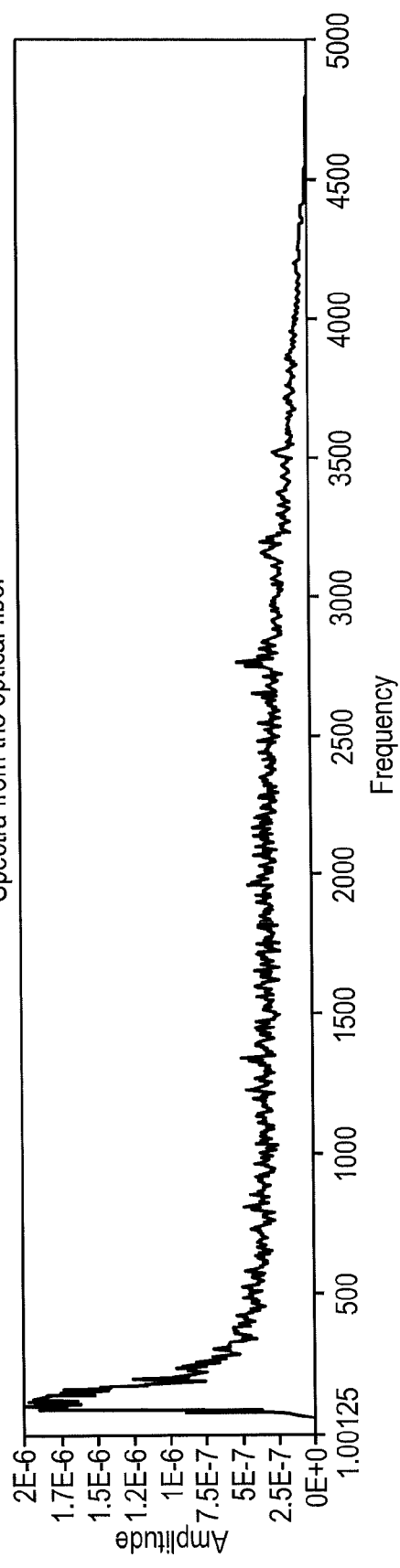
Figure 16C:
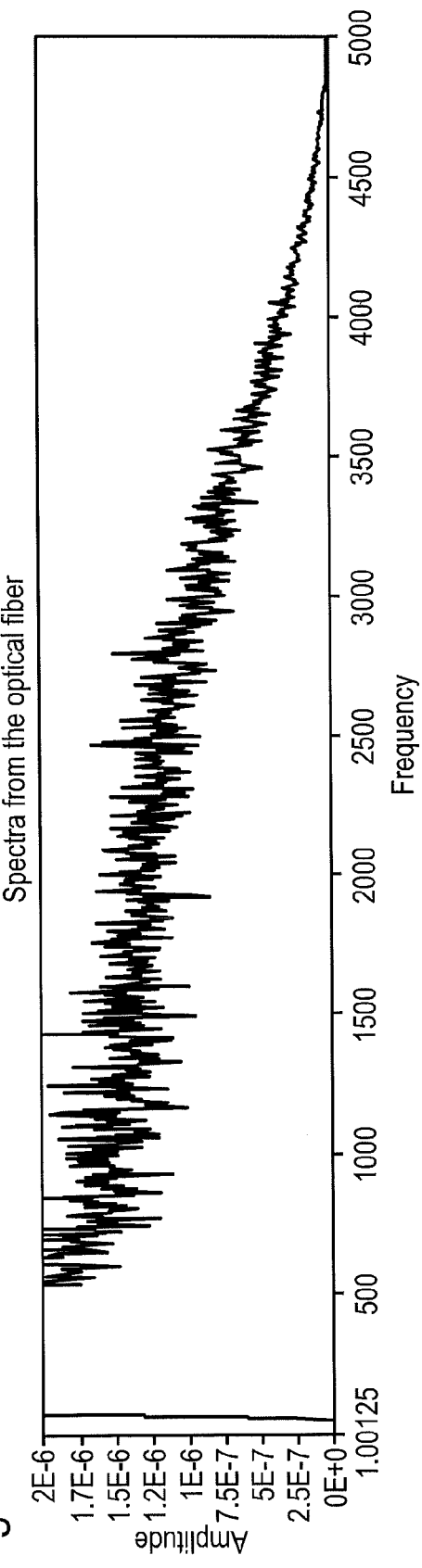
Figure 16D:
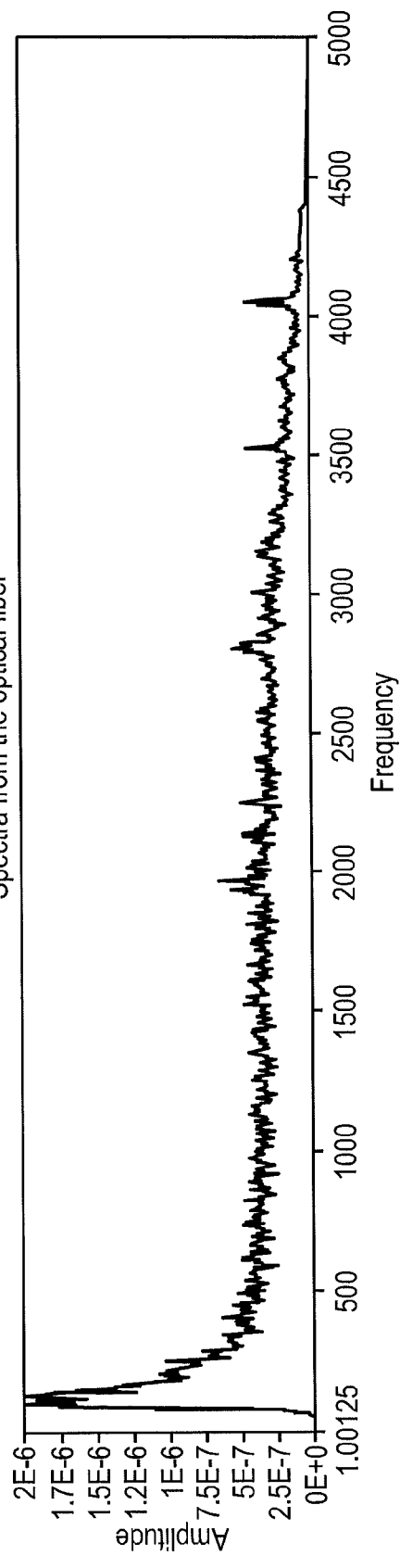
Figure 16E:
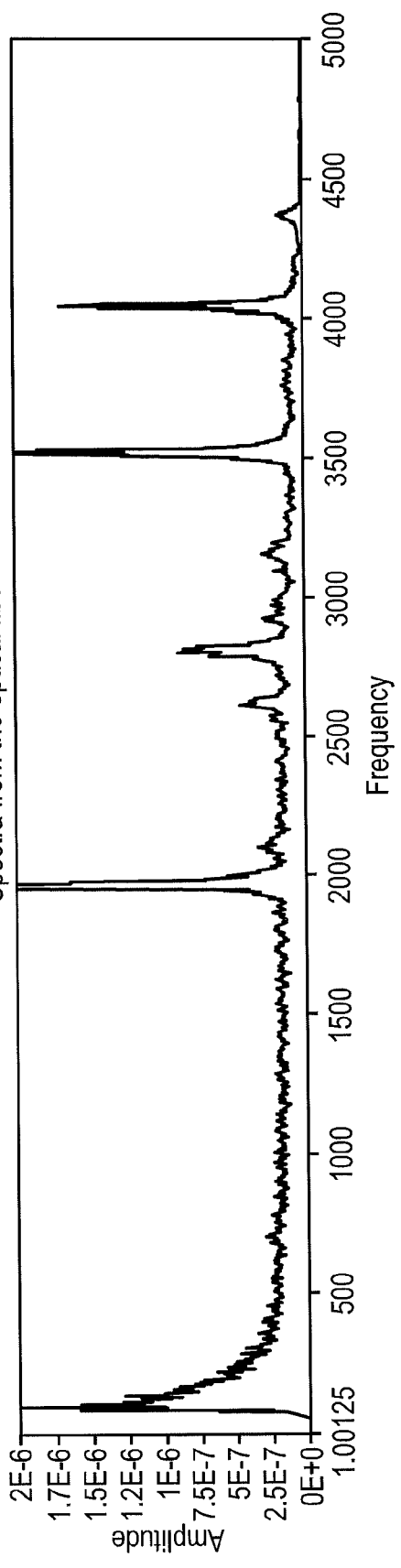

In another exemplary embodiment, the level of fluid in a vessel can be detected by monitoring a change in spectral amplitude and shape at measurements taken at various locations along the sensor array of distributed fiber sensor. FIGS. 16a-16e are graphical illustrations of the detection of fluid level in a vessel in accordance with an exemplary embodiment. FIGS. 16a and 16b illustrate the spectral amplitude measured by the sensor array in signals located above the surface of the fluid. FIG. 16c illustrates the spectral amplitude of signals measured at a location at or near the surface of the fluid. FIGS. 16d and 16e illustrate the spectral amplitude measured by the sensor array in signals located below the surface of the fluid. When comparing the spectral amplitude among the various measurement locations shown in these figures, it should be apparent that the greatest change in spectral amplitude and shape is observed in signals located at or near the surface of the fluid in the vessel.

FIG. 17 is a flowchart of a method for eradicating structure borne signals on the vessel in accordance with an exemplary embodiment. If an outer surface of a vessel is an efficient conductor of acoustic energy, it has been observed that the signal within the shell might tend to overwhelm the signal from within the layered medium. If the velocity of the acoustic energy at the shell of a coker is much different from the expected acoustic energy generated in the medium inside the coker, then processing can be performed to remove the acoustic influences of the shell.

In a step 1700, the sensor array measures the acoustic energy of a noise source (time-varying) that illuminates the inner volume of the vessel. The signal processor 16 receives the outputs from the sensors and applies a velocity filter to the measured energy to attenuate the unwanted signal (step 1702). In this instance, the velocity filter can be implemented as a two-dimensional filter based on the inverse Fourier transform:

$$f(t,s) = \int_{-F}^{F} \int_{-|f_1/V_C|}^{|f_1/V_C|} e^{i2\pi(f_1 t + f_1 s)} df_2 df_1 \qquad (6)$$

where the integrand is the Fourier transform of the original signal, and the system is integrated over the data having wavenumbers $-|f_1/V_C|$ to $|f_1/V_C|$ and from frequency $-F$ to $F$. The filtered signal can then be processed using a daylight imaging techniques as previously discussed (step 1704).

In another exemplary embodiment, the outputs of a group of closely spaced sensors may be combined to enhance the directional sensitivity to the acoustic signal emanating within the vessel. For example, a selected group of closely-spaced sensors can be used to define a spatial aperture. The acoustic energy emanating from sources inside the vessel represents the desired signals, and the acoustic energy emanating from the vessel wall represents the interference signals. The selected group of closely-spaced sensors of the sensor array measures the acoustic energy. The signal processor 16 receives the outputs from the sensors and applies a spatial filter to the measured energy to attenuate the interference signals emanating from the vessel wall, based on the spatial separation between the noise source in the vessel and the vessel wall. It should be readily apparent that any known spatial filtering or beam forming technique can be used to process output of the sensors and detect the desired frequency of acoustic energy.

While the exemplary embodiments have been described with reference to specific embodiments, this description is merely representative of the invention and is not to be construed as limiting the invention any one of the disclosed embodiments. Various modifications and applications of the disclosed embodiments may occur to those skilled in the art without departing from the true spirit and scope of the invention as defined by the appending claims.

What is claimed is:

1. A system for imaging material contained inside an enclosure, comprising:
    a plurality of synchronized acoustic sensors positioned at a periphery of an inner volume of the enclosure to sense acoustic energy emanating from the material in the enclosure during an industrial process; and
    a processor that combines an output of each of the acoustic sensor to identify at least one ambient noise source generating a noise field that illuminates the inner volume of the enclosure and to produce image data of the material by temporal and spatial coherent processing of the transmission and reflection of the noise field generated by the noise source;
    wherein an output of each sensor in a group of closely spaced sensors are combined to enhance a directional sensitivity to the acoustic signal emanating within the enclosure.

2. The system of claim 1, wherein at least one of the plurality of acoustic sensors is a microphone.

3. The system of claim 1, wherein at least one of the plurality of sensors is an accelerometer.

4. The system of claim 1, wherein at least one of the plurality of sensors is a fiber optic accelerometer.

5. The system of claim 1, wherein the plurality of sensors comprises a continuous length of optical fiber attached to a surface of vessel and the acoustic signals perturbing the fiber at different positions are synchronously detected using a distributed optical fiber acoustic sensing system.

6. The system of claim 1, wherein the plurality of sensors are positioned in optimum configurations such as in helical arrangements around the enclosure.

7. The system of claim 1, wherein the enclosure is a pipeline, a coke drum, a vessel, a conduit, or a container that contains the material.

8. The system of claim 1, wherein the processor processes the sensed acoustic energy of each sensor using beam forming technique.

9. A method of imaging material in an inner volume of an enclosure, comprising:
    detecting acoustic signals generated by an industrial process through a plurality of synchronized sensors positioned at a periphery of the inner volume of the enclosure;
    identifying at least one ambient noise source generating a noise field that illuminates the inner volume of the enclosure comprising generating a map of the detected acoustic signals in the inner volume of the enclosure; and
    associating the mapped acoustic signals with characteristics of the industrial process; and
    generating an acoustic image of material illuminated by the noise field through temporal and spatial coherent processing of the transmission and reflection of the noise field generated by the at least one ambient noise source;
    wherein generating the map of the detected acoustic signals, comprises:
        generating a plurality of two-dimensional image slices of the inner volume of the enclosure; and
        combining the two-dimensional image slices to generate a three-dimensional image of at least a portion of the inner volume of the enclosure.

10. The method of claim 9, wherein associating the mapped acoustic signals comprises:
    analyzing frequency components of the detected acoustic signals through a Fast Fourier Transform and/or a Wavelet Transform.

11. The method of claim 9, wherein generating the map of the detected acoustic signals further comprises:
    measuring a time of flight of one of the detected acoustic signals at each one of the plurality of sensors; and
    determining a location of the source of said one of the detected acoustic signals based on the time of flight of said one of the detected acoustic signals at each one of the plurality of sensors.

12. The method of claim 9, wherein generating the map of the detected acoustic signals further comprises:
    identifying an acoustic impedance mismatch among the detected signals of the plurality of sensors; and
    measuring a time of flight of the detected signals in a triangulation scheme of corresponding sensors to locate a boundary between materials contained in the enclosure.

13. The method of claim 9, further comprising:
    array filtering acoustic signals detected at an outer surface of the vessel.

14. The method of claim 9, wherein the object of interest within the volume is nonspecific and observed passively, and wherein a contour of the object is detectable as a result of reflection or absorption of ambient sound.

15. A computer readable medium containing a program which when compiled on a computer causes the computer to execute a process of imaging material in an inner volume of an enclosure of an industrial process, the method comprising:
    synchronizing acoustic signals of a plurality of sensors disposed at a periphery of the inner volume of the enclosure;

generating a plurality of two-dimensional images of the inner volume of the enclosure based on the synchronized acoustic signals;
associating the synchronized acoustic signals with characteristics of the material in the industrial process;
identifying at least one source of the synchronized signals in the enclosure; and
stacking the plurality of two-dimensional images to generate a three-dimensional image of the inner volume of the enclosure.

* * * * *